United States Patent
Tang et al.

(10) Patent No.: US 8,487,492 B2
(45) Date of Patent: Jul. 16, 2013

(54) MOTOR ASSEMBLY WITH A BEARING IN A SLEEVE TO SUPPORT THE SHAFT

(75) Inventors: Xian Tang, Shenzhen (CN); Jian Luo, Hong Kong (CN)

(73) Assignee: Johnson Electric S.A., La Chaux-de-Fonds (CH)

( * ) Notice: Subject to any disclaimer, the term of this patent is extended or adjusted under 35 U.S.C. 154(b) by 499 days.

(21) Appl. No.: 12/568,238

(22) Filed: Sep. 28, 2009

(65) Prior Publication Data

US 2010/0079020 A1     Apr. 1, 2010

(30) Foreign Application Priority Data

Sep. 28, 2008   (CN) .......................... 2008 1 0216439

(51) Int. Cl.
    *H02K 5/16*         (2006.01)

(52) U.S. Cl.
    USPC ................. 310/90; 384/276; 384/295; 310/83

(58) Field of Classification Search
    USPC .......... 310/80, 83; 384/276, 295, 215; 16/2.1, 16/2.2, 2.5, 108, 109
See application file for complete search history.

(56) References Cited

U.S. PATENT DOCUMENTS

| | | | | |
|---|---|---|---|---|
| 3,302,048 A | * | 1/1967 | Gray ................................. | 310/90 |
| 4,227,104 A | * | 10/1980 | Hamman ..................... | 310/75 R |
| 4,623,810 A | * | 11/1986 | Smith ............................... | 310/90 |
| 5,688,054 A | * | 11/1997 | Rabe ............................... | 384/295 |
| 5,747,903 A | * | 5/1998 | Klingler ....................... | 310/75 R |
| 5,887,982 A | * | 3/1999 | Wilcher ........................... | 384/97 |
| 6,486,577 B1 | * | 11/2002 | Ursel et al. ........................ | 310/51 |
| 6,802,648 B2 | * | 10/2004 | Merot et al. .................. | 384/215 |
| 6,831,381 B2 | * | 12/2004 | Ursel et al. ................... | 310/75 R |
| 2004/0057643 A1 | * | 3/2004 | Blanchard et al. ............ | 384/276 |

FOREIGN PATENT DOCUMENTS

| | | | |
|---|---|---|---|
| EP | 703655 A1 | * | 3/1996 |
| EP | 2104204 A1 | * | 9/2009 |
| JP | 2008160907 A | * | 7/2008 |
| WO | WO 2006108389 A1 | * | 10/2006 |

OTHER PUBLICATIONS

Drexlmeier et al, EP 703655 A1 Machine Translation, Mar. 1996.*

* cited by examiner

*Primary Examiner* — Tran Nguyen
*Assistant Examiner* — Eric Johnson
(74) *Attorney, Agent, or Firm* — Muncy, Geissler, Olds & Lowe, PLLC

(57) ABSTRACT

A motor assembly comprises a gearbox (1), a motor (2) and a bushing assembly. The motor has a motor shaft (22), a worm is fixed to or formed on a worm portion of the motor shaft, which is located in the gearbox. The worm potion of a motor shaft is supported by a bushing assembly. The bushing assembly comprises a sleeve (4) and a bushing (3) fixed inside the sleeve. The bushing comprises a plurality of axial ribs (31) arranged around its outer surface. The sleeve comprises a plurality of grooves (41) in its inner surface which engage the ribs on the bushing. The sleeve also comprises a plurality of ribs around its outer peripheral surface which engage with the gearbox. The motor shaft is strengthened by the bushing assembly, and a self-locking ability of motor assembly is improved.

18 Claims, 5 Drawing Sheets

MOTOR ASSEMBLY WITH A BEARING IN A SLEEVE TO SUPPORT THE SHAFT

CROSS REFERENCE TO RELATED APPLICATIONS

This non-provisional patent application claims priority under 35 U.S.C. §119(a) from Patent Application No. 200810216439.2 filed in The People's Republic of China on Sep. 28, 2008.

FIELD OF THE INVENTION

This invention relates to a motor assembly and in particular, to a motor assembly having a bushing sleeve.

BACKGROUND OF THE INVENTION

A motor assembly usually comprises a motor and a gearbox. The motor comprises a motor shaft which is supported by bearings fixed in a motor housing. One end of the motor shaft protrudes from one end cap of the motor housing from a first bearing fixed in the end cap and extends to a second bearing fixed in the gearbox. The motor shaft comprises a worm located between the first and second bearings. The worm rotates with the motor shaft and is used to drive a worm gear of the gearbox.

As is known, the motor shaft will receive a reaction force from the worm gear when the worm drives the worm gear or when the worm is driven by the worm gear. The reaction force may be sufficient to bend the motor shaft resulting in vibration and noise. When the motor shaft is bent, the worm will not match the worm gear well any more, which will lower or disable the self-locking ability between the worm and the worm gear. The self-locking ability is the characteristic which prevents the worm wheel from driving the motor. This is desirable in some applications for example due to safety and security issues where the motor assembly moves a load but an external force applied to the load will not move the load.

One solution to overcome the above problem is to use a larger motor shaft. However, the size of the motor, the worm and the gearbox will be increased to match the larger motor shaft, which will make the motor assembly larger, heavier and cost more.

Therefore, there is a desirable for an improved motor assembly with a strengthened motor shaft and a small size.

SUMMARY OF THE INVENTION

Accordingly, in one aspect thereof, the present invention provides a motor assembly, comprising a gearbox and a motor engaging the gearbox, a motor shaft of the motor being supported by a first bearing fixed in a front cap of the motor, one end of the motor shaft protruding from the front cap and being supported by a second bearing fixed in the gearbox, a worm fixed to a worm portion of the motor shaft between the first and second bearings, the worm rotating with the motor shaft to drive a worm gear of the gearbox, wherein the gearbox comprises a chamber located between the first bearing and the worm, a bushing assembly being fixed in the chamber, the bushing assembly comprising a sleeve and a bushing disposed inside the sleeve, the motor shaft being supported by the bushing, the bushing having a plurality of ribs arranged around its outer peripheral surface, the sleeve engaging with an inner surface of the chamber and having a plurality of grooves in an inner surface engaging the ribs on the bushing, axial ends of the bushing assembly being contacted by the front cap and the bottom of the chamber preventing the bushing assembly from moving axially.

Preferably, a stopper is formed at one end of the sleeve, the stopper extending inwardly to prevent the bushing sliding out of the sleeve.

Preferably, the sleeve has a plurality of ridges each of which is formed between two adjacent grooves, a bump extending radially inwardly being formed on at least some of the ridges, at the end of the sleeve remote from the stopper, the bumps cooperating with the stopper to prevent the bushing moving axially with respect to the sleeve.

Preferably, the stopper is an annular flange whose inner diameter is smaller than the outer diameter of the bushing.

Preferably, the sleeve has an annular ring-shape structure, and has a plurality of axial ribs formed on an outer peripheral surface, the chamber having a plurality of axial grooves engaging the axial ribs of the sleeve.

Preferably, one end of each axial rib of the sleeve tapers to form a guide portion.

Preferably, the sleeve comprises a plurality of slots arranged in its side wall, the openings of the slots being arranged in one axial end of the sleeve which is remote from the stopper, each slot radially penetrating the side wall.

Preferably, the sleeve comprises a plurality of axial dummy slots in its side wall, the openings of the dummy slots and the openings of the axial slots being in the same end of the sleeve.

Preferably, the bushing is made of metal and the sleeve is made of an engineering plastics material.

According to a second aspect, the present invention provides a sleeve for being installed around a bushing having a plurality of axial ribs arranged around its outer surface, wherein the sleeve has a plurality of axial grooves in its inner surface to engage with the axial ribs of the bushing, and has a plurality of axial ribs in its outer peripheral surface.

Preferably, a stopper is formed at one end of the sleeve, the stopper extending inwardly to limit axial movement of the bushing through the sleeve.

Preferably, the sleeve has ridges each of which is formed between two adjacent grooves, bumps extending radially inwardly formed at the end of the ridges remote from the stopper, the bumps cooperating with the stopper to prevent the bushing moving axially with respect to the sleeve.

Preferably, the stopper is an annular flange whose inner diameter is smaller than the outer diameter of the bushing.

Preferably, the stopper is formed by several bumps spaced from each other.

Preferably, the sleeve is an annular ring-shape structure, the ribs of the sleeve extending axially, one end of each rib tapers to form a guide portion.

An advantage of the present invention is that the worm portion of motor shaft is supported by the bushing assembly, preventing the worm portion bending too much. Therefore, the worm portion is strengthened and a self-locking ability of the motor assembly is improved.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labelled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
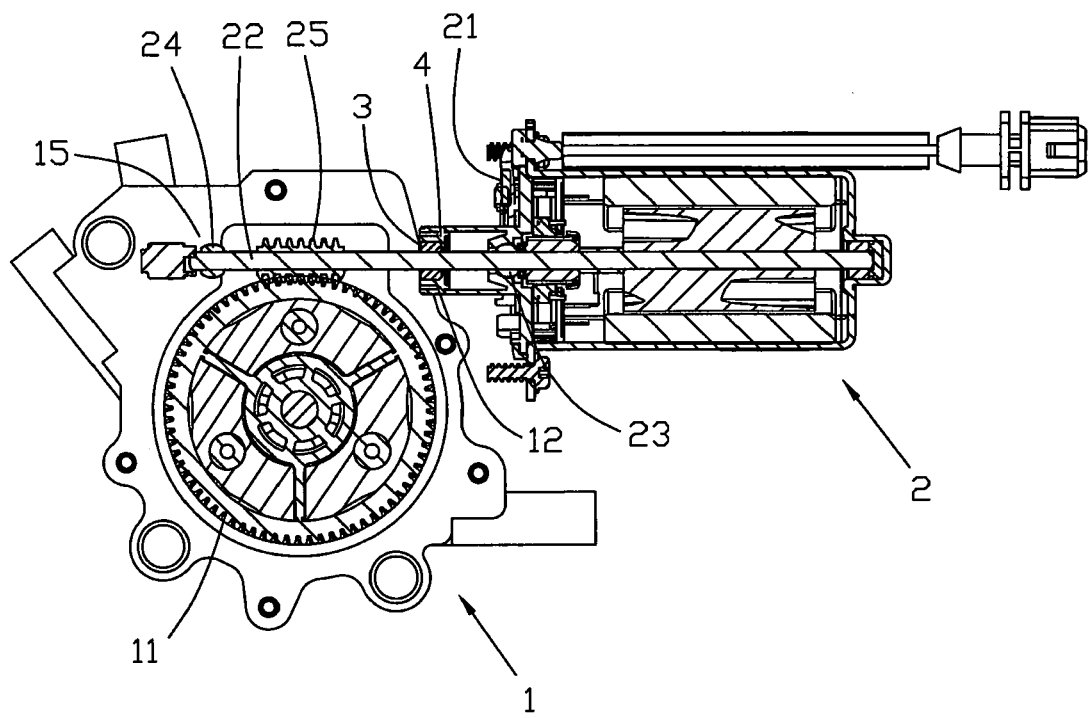
FIG. 1 is a sectional view of a motor assembly in accordance with the present invention.
Figure 2:
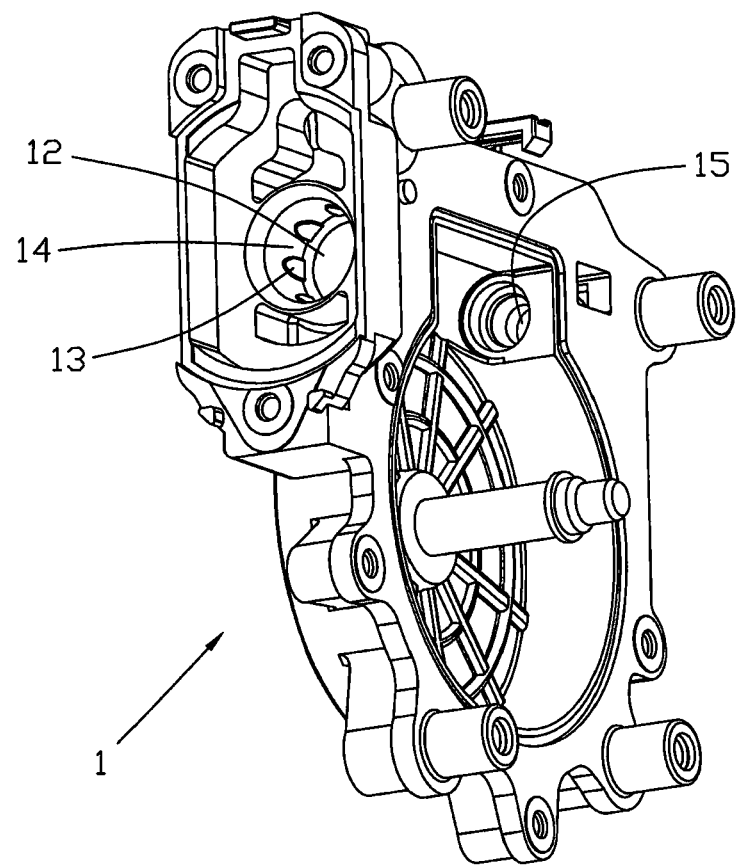
FIG. 2 is a partial perspective view of the gearbox of FIG. 1.

FIG. 1 shows a motor assembly in according with the present invention. The motor assembly comprises a gearbox 1 and a motor 2. FIG. 2 is a perspective view of a portion of the gearbox. As shown in FIGS. 1 and 2, the gearbox 1 is located in front of the motor 2, adjacent to a front cap 21 of the motor. The front cap may be referred to a an end cap of the motor. The front cap 21 is usually made of a plastics material. A first bearing 23 is fixed in the front cap 21. The motor comprises a motor shaft 22, which is supported by the first bearing 23 and protrudes from the front cap. The gearbox 1 comprises an inner chamber 15 to accommodate a portion of the motor shaft protruding outside the motor. A second bearing 24 is fixed at the bottom of the inner chamber 15. The protruding end of the motor shaft 22 is supported by the second bearing 24. As such, the portion of the motor shaft 22 outside the motor is supported by the first bearing 23 and the second bearing 24. A worm 25 is fixed onto a worm portion of the motor shaft 22 between the first and second bearings. The worm 25, being fixed to or formed as a part of the worm portion, rotates with the motor shaft 22 to drive a worm gear 11 of the gearbox 1.

Figure 3:
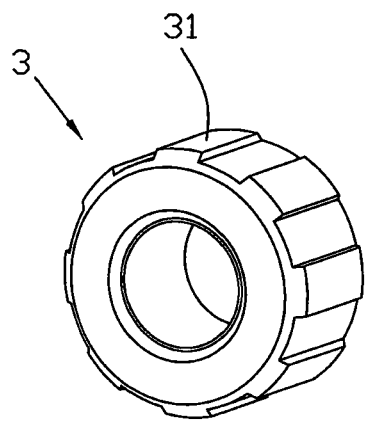
FIG. 3 is a perspective view of a bushing.
Figure 4:
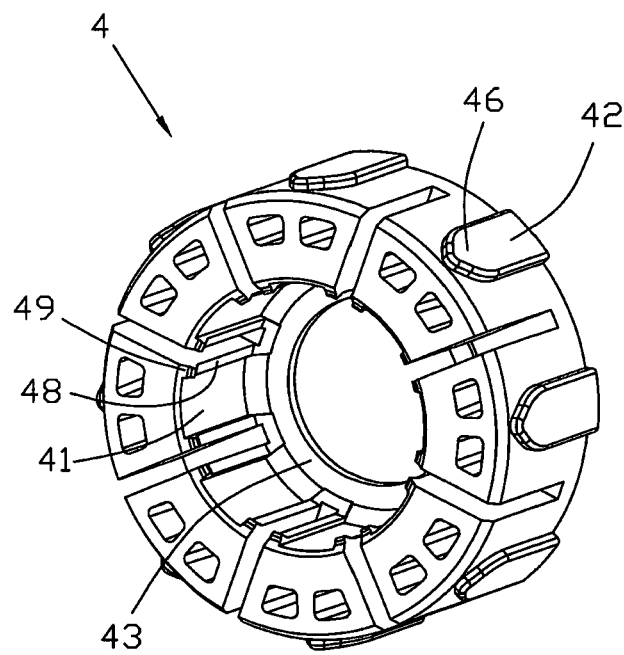
FIG. 4 is a perspective view of a bushing sleeve.
Figure 5:
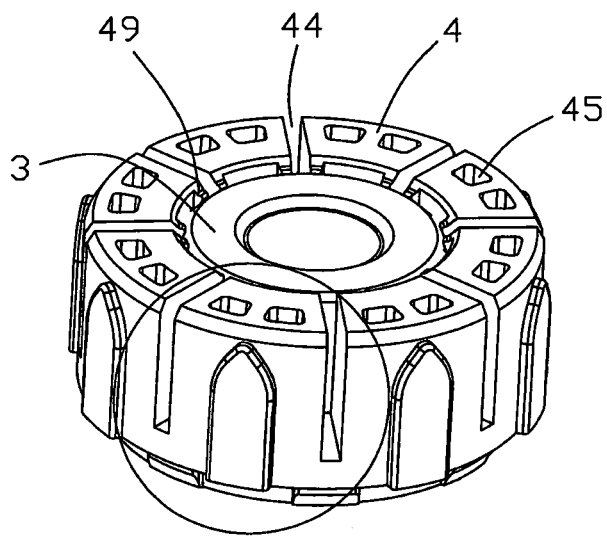
FIG. 5 is a perspective view of a bushing assembly comprising the bushing of FIG. 4 fitted to the bushing sleeve of FIG. 5.

The gearbox 1 comprises an outer chamber 12 between the worm 25 and the first bearing 23. A bushing assembly is fixed inside the chamber 12. The bushing assembly comprises a bushing 3 and a bushing sleeve 4. FIG. 3 is a perspective view of the bushing 3. FIG. 4 is a perspective view of the bushing sleeve 4, which is preferably made of an engineering plastics material, such as PA66. FIG. 5 shows the bushing assembly. Referring to FIG. 1 to FIG. 5, the bushing 3 is fixed inside the bushing sleeve 4, which is fixed inside the chamber 12. The motor shaft 22 is rotatably supported by the bushing 3. The bushing 3 has several axial ribs 31 arranged around its outer peripheral surface. The ribs 31 are used to engage/bite the bushing sleeve 4 to prevent the bushing 3 rotating with respect to the bushing sleeve 4. It is preferred that the bushing sleeve 4 has several axial grooves 41 in its inner peripheral surface to receive the axial ribs 31 of the bushing. In the present embodiment, the bushing sleeve 4 also has several ribs 42 on its outer peripheral surface, and the chamber 12 has several axial grooves 14 which engage with the ribs of the bushing sleeve 4. It is preferred that the two ends of the bushing assembly are pressed between the bottom of the chamber 12 and the motor's front end 21 respectively. With this configuration, the bushing assembly is prevented from sliding axially.

In the above embodiment, the bushing assembly is disposed between the worm 25 and the first bearing 23. As such, the worm portion of the motor shaft, to which the worm is fixed, is supported by the bushing assembly and the second bearing 24, which will make the worm portion of the motor shaft much stronger and prevent the worm portion from bending too much. By implementing the present invention, a motor shaft of 4 mm outer diameter (OD) will have an anti-bending strength equivalent to that of a 9 mm OD motor shaft in a conventional motor assembly. A person of ordinary skill in the art will appreciate that the worm portion will have more anti-bending strength if the bushing assembly is disposed closer to the worm.

As above, by implementing the present invention, the motor shaft 22, especially the worm portion will have an enhanced strength. The worm will match the worm gear 11 better even if a force is imposed on the worm by an external load via the worm gear. Therefore, the motor assembly will have an improved self-locking performance.

In the above embodiment, the motor assembly can be assembled as per the following steps. The bushing assembly is assembled onto the motor shaft 22. Then the motor shaft 22 is put inside the chamber 12 of the gearbox and goes through a hole formed in the bottom of the chamber 12 to reach to the inner chamber 15. Then the worm 25 is fixed onto the motor shaft. Then the free end of the motor shaft 22 is fixed into the second bearing 24. When assembled, the bushing assembly is sandwiched by the bottom of the chamber 12 and the front cap 21 of the motor and thus is prevented from sliding axially. A person of ordinary skill will appreciate that the motor assembly can be assembled as per other methods.

Figure 9:
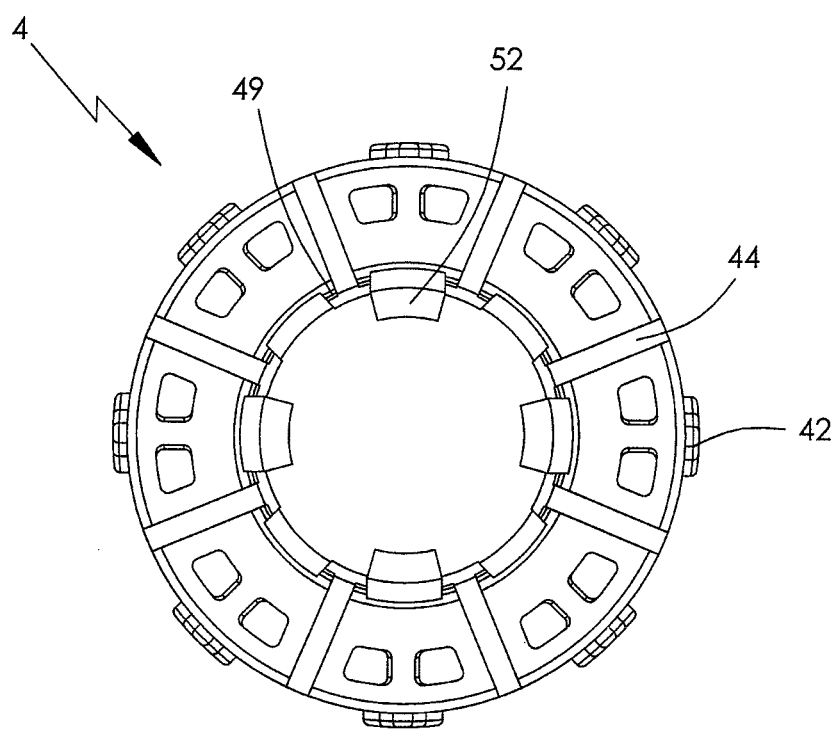
FIG. 9 is an end view of a bushing sleeve according to a further embodiment.

Referring to FIG. 4, a stopper 43 can be formed at one end of the bushing sleeve 4. When the bushing 3 is positioned inside the bushing sleeve 4, the stopper 43 can prevent the bushing 3 moving/sliding out of the sleeve. The stopper 43 is an annular flange, whose inside diameter is smaller than the outer diameter of the bushing 3. In an alternative embodiment, as shown in FIG. 9, the stopper 43 is not a single annular flange. Instead, the stopper 43 comprises several bumps 52 spaced from each other and extending radially inwardly. When the sleeve 4 is assembled inside the chamber 12, the stopper 43 is adjacent to or contacting the bottom of the chamber 12. The hole formed in the bottom of the chamber 12 may have a larger outside diameter than that of the worm 25. In this regard, when manufacturing the motor assembly, a bushing assembly and a worm 25 can be fixed onto the motor shaft 22 firstly, and then the motor shaft 22 and the worm 25 can go through the hole formed in the bottom of chamber 12 and enter into the inner chamber 15. It would be more effective and speed up the assembly.

As shown in FIG. 4, one or more axially extending ridges 48 are formed between adjacent axial grooves 41. A bump 49 is formed at one end of the ridge 48, opposite to the stopper 43. In the embodiment, the bump 49 is a flexible triangular shape bump, for example, made of engineering plastics material PA66. When the bushing 3 is being pressed into the sleeve 4, the bump 49 is pressed by the outer circumferential surface of the bushing 3. When the bushing 3 is positioned inside the sleeve 4, the bump 49 is pressed by one end of the bushing 3, and the stopper 43 is pressed by the other end of the sleeve 4. As such, the bushing 3 is fixed in the sleeve 4 and can not slide axially with respect to the sleeve 4.

As a preferred embodiment, the sleeve 4 is a hollow cylinder. The axial ribs 42 are arranged around the outer circumferential surface of the sleeve 4. The axial grooves 14 of the chamber 12 (shown in FIG. 2) engage with the axial ribs 42. Therefore, the relative rotation between the sleeve 4 and the chamber 12 is limited, and the vibration and noise is reduced.

As an alternative embodiment, the sleeve 4 is a hollow prism. The hollow prism comprises several side walls and several axial edges, each of which connects two adjacent side walls. The axial edge between two adjacent surfaces functions as the rib 42. The chamber 12 is prism-shape to match the sleeve 4.

As a preferred embodiment, one end of each axial rib 42 tapers, functioning as a guide portion 46, so that the sleeve 4 can be pressed inside the chamber 12 more easily. Furthermore, as shown in FIG. 2, similar guide portions 13 can be form in the chamber 12. The guide portions 13 and guide portions 46 match mutually with each other to guide the engagement of the sleeve with the outer chamber 12.

In an alternative embodiment, the inner diameter of the sleeve 4 increases gradually from one end to the other end, which makes it easier to press the bushing 3 into the sleeve 4.

In a further alternative embodiment, as shown in FIG. 4, there are several axial slots 44 arranged in the side wall of the sleeve 4. The axial slots 44 are spaced from each other. The openings of the slots are arranged in one end of the sleeve 4 which is opposite to the stopper. Each slot 44 radially penetrates the side wall of the sleeve 4, and extends axially from one end of the sleeve 4 to the opposite half portion of the sleeve 4. With this configuration, the sleeve 4 can match the bushing 3 easily, even if there is an error between the outer diameter of the bushing 3 and the inner diameter of the sleeve 4. As is known, the error may result from process inaccuracy, material deformation in molding process, tolerance build up, etc.

Figure 6:
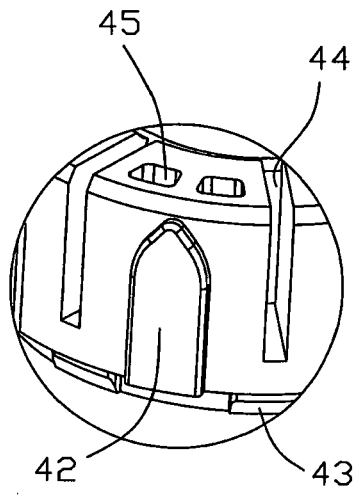
FIG. 6 is an enlarged view of a portion of the bushing sleeve of FIG. 5.

Referring to FIG. 5 and FIG. 6, a plurality of axial dummy slots 45 are formed in the side wall of the sleeve 4. Both the opening of the dummy slot 45 and the opening of the slot 44 are located in the same end surface of the sleeve 4. In the present embodiment, there are two dummy slots 45 between each two adjacent slots 44. Vibration is buffered by the dummy slots 45.

Figure 7:
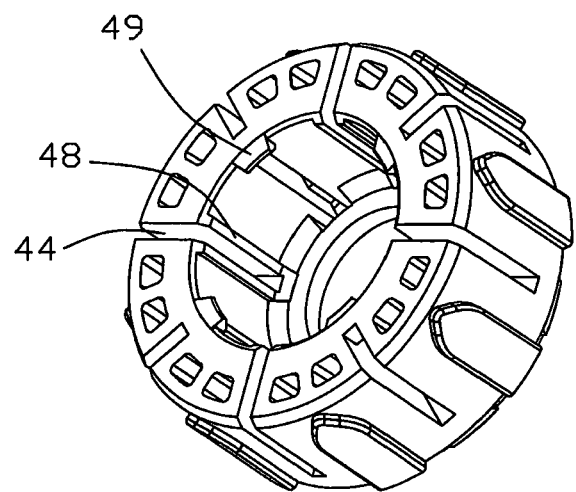
FIG. 7 and FIG. 8 are perspective views of another bushing sleeve in accordance with the present invention.
Figure 8:
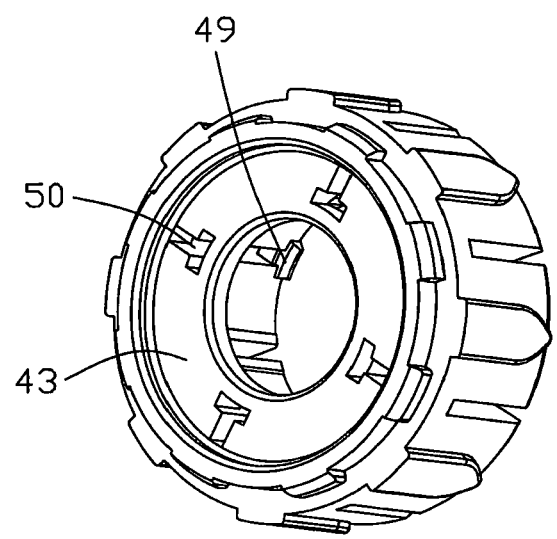

FIG. 7 and FIG. 8 show another sleeve in according with another embodiment of the present invention. As shown in FIGS. 7 and 8, there is one bump 49 between every two adjacent axial grooves 41. A plurality of molding holes 50 are formed in the single annular stopper 43. The number of molding holes 50 equals to the number of the bumps 49, which is opposite to the stopper 43. With the molding holes 50, the molding of the bumps is easy, and the structure of the mold is simplified. The bumps 49 hold the bushing 3 within the sleeve 4, as described above.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A motor assembly, comprising a gearbox and a motor engaging the gearbox, a motor shaft of the motor being supported by a first bearing fixed in a front cap of the motor, one end of the motor shaft protruding from the front cap and being supported by a second bearing fixed in the gearbox, a worm fixed to a worm portion of the motor shaft between the first and second bearings, the worm rotating with the motor shaft to drive a worm gear of the gearbox, wherein the gearbox comprises a chamber located between the first bearing and the worm, a bushing assembly being fixed in the chamber, the bushing assembly comprising a sleeve and a bushing disposed inside the sleeve, the motor shaft being supported by the bushing, the bushing having a plurality of ribs arranged around its outer peripheral surface, the sleeve engaging with an inner surface of the chamber and having a plurality of grooves in an inner surface engaging the ribs on the bushing, axial ends of the bushing assembly being contacted by the front cap and the bottom of the chamber preventing the bushing assembly from moving axially, a stopper being formed at one end of the sleeve, the sleeve comprising a plurality of ridges each of which is formed between two adjacent grooves, a bump extending radially inwardly being formed on at least some of the ridges, at the end of the sleeve remote from the stopper, the bumps cooperating with the stopper to prevent the bushing moving axially with respect to the sleeve, the sleeve having a plurality of axial ribs formed on an outer peripheral surface, the chamber having a plurality of axial grooves engaging the axial ribs of the sleeve, one end of each axial rib tapering axially to form a guide portion, one end of each axial groove tapering axially to form a guide portion, the guide portions of the chamber and the guide portions of the sleeve matching mutually with each other to guide the engagement of the sleeve with the chamber.

2. The motor assembly of claim 1, wherein the stopper is an annular flange whose inner diameter is smaller than the outer diameter of the bushing.

3. The motor assembly of claim 1, wherein the sleeve has an annular ring-shape structure.

4. The motor assembly of claim 1, wherein the sleeve comprises a plurality of axial slots arranged in its side wall, the openings of the slots being arranged in one axial end of the sleeve which is remote from the stopper, each slot radially penetrating through the side wall.

5. The motor assembly of claim 4, wherein the sleeve comprises a plurality of axial dummy slots in its side wall, the openings of the dummy slots and the openings of the axial slots being in the same end of the sleeve, along a circumferential direction of the sleeve at least one dummy slot located between two adjacent axial slots.

6. The motor assembly of claim 5, wherein the bushing is made of metal and the sleeve is made of an engineering plastics material.

7. A sleeve for being installed around a bushing having a plurality of axial ribs arranged around its outer surface, wherein the sleeve has a plurality of axial grooves in its inner surface to engage with the axial ribs of the bushing, and has a plurality of axial ribs in its outer peripheral surface, the sleeve comprising a plurality of axial slots arranged in its side wall which surrounds a space for receiving the bushing therein, each of the slots radially penetrating through one axial distal end of the side wall to separate the distal axial end of the side wall into a plurality of spaced portions to thereby increase flexibility of the side wall, each of the slots communicating the space with outside of the side wall.

8. The sleeve of claim 7, wherein a stopper is formed at one opposite axial end of the sleeve, the stopper extending inwardly to limit axial movement of the bushing through the sleeve.

9. The sleeve of claim 8, wherein the sleeve has ridges each of which is formed between two adjacent grooves, the ridges and grooves being arranged in the inner surface alternately in a circumferential direction of the sleeve, bumps extending radially inwardly formed at the end of the ridges remote from the stopper, the bumps cooperating with the stopper to prevent the bushing moving axially with respect to the sleeve.

10. The sleeve of claim 8, wherein the stopper is an annular flange whose inner diameter is smaller than the outer diameter of the bushing.

11. The sleeve of claim 8, wherein the stopper is formed by several bumps spaced from each other.

12. The sleeve of claim 8, wherein the ribs of the sleeve extend axially, one end of each rib tapers axially to form a guide portion which has a gradually reduced width in a circumferential direction compared to the remained portion of the rib.

13. The sleeve of claim 8, wherein the inner diameter of the sleeve decreases gradually in a direction from the end of the sleeve having the stopper to the other end of the sleeve.

14. The sleeve of claim 8, wherein the openings of the slots are arranged in one end of the sleeve which is opposite to the stopper.

15. The sleeve of claim 14, wherein the sleeve comprises a plurality of axial dummy slots in its side wall, the openings of the dummy slots and the openings of the axial slots being in the same end of the sleeve.

16. A sleeve for being installed around a bushing having a plurality of axial ribs arranged around its outer surface, wherein the sleeve has a plurality of axial grooves in its inner surface to engage with the axial ribs of the bushing, and has ridges each of which is formed between two adjacent grooves along a circumferential direction of the sleeve, the ridges and grooves being arranged in the inner surface alternately in a circumferential direction of the sleeve, a stopper being formed at one end of the sleeve, bumps extending radially inwardly formed at the end of the ridges remote from the stopper, the bumps cooperating with the stopper to prevent the bushing moving axially with respect to the sleeve.

17. The sleeve of claim 16, wherein the sleeve comprises a plurality of axial slots formed in its side wall, each axial slot extending radially through a corresponding ridge, each axial slot being spaced from the two adjacent grooves in the circumferential direction of the sleeve.

18. The sleeve of claim 16, wherein the sleeve comprises a plurality of dummy slots arranged in its side wall, each of the dummy slots being located between and spaced from the inner surface and outer surface of the sleeve, at least one dummy slot located between two adjacent axial slots in the circumferential direction of the sleeve.

\* \* \* \* \*